3,503,844
CORD FOR COATING BY BLOWPIPE PROJECTION

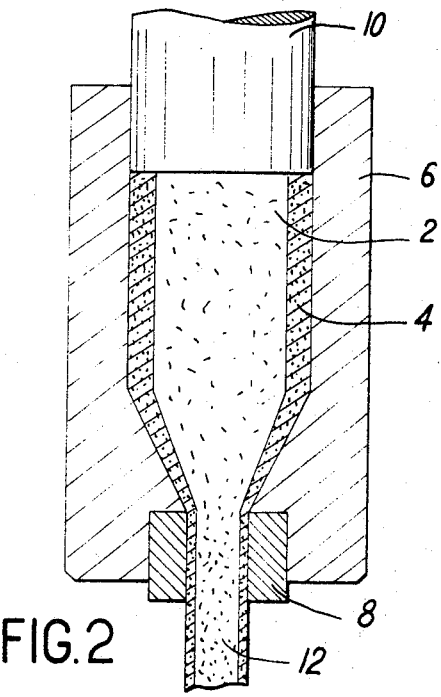
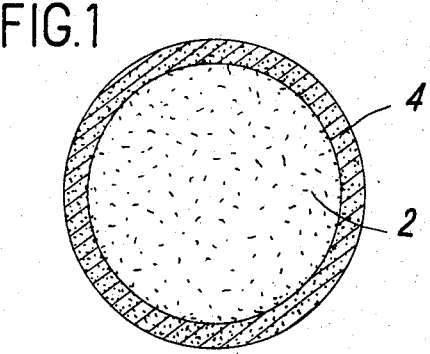

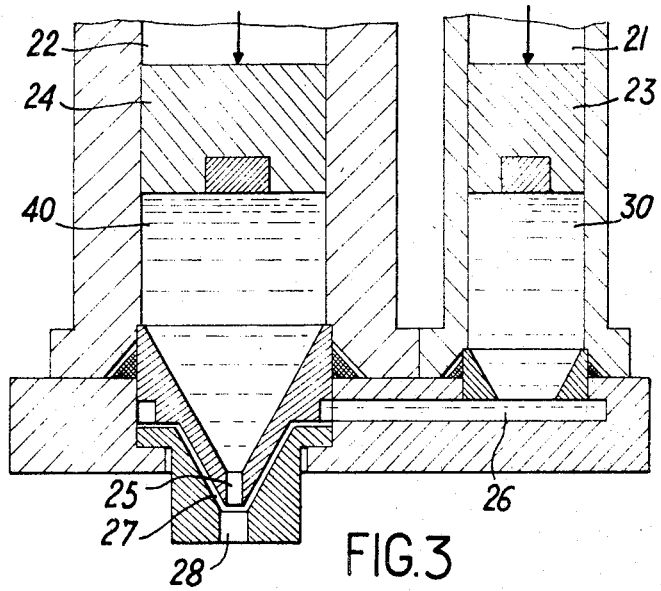
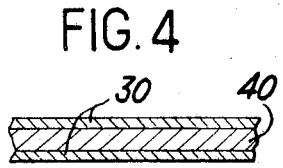
FIG. 4
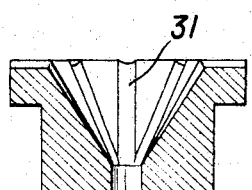
FIG. 5
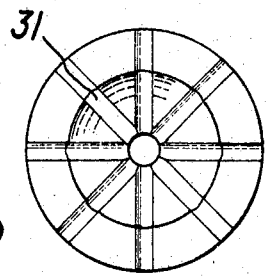
FIG. 6

René Clement, Suze-la-Rousse, France, assignor to Commissariat a l'Energie Atomique and Societe de Fabrication d'Elements Catalytiques (SFEC), both of Paris, France
Filed Mar. 3, 1966, Ser. No. 531,393
Claims priority, application France, Mar. 11, 1965, 8,778; Feb. 24, 1966, 51,023
Int. Cl. B29d 1/10
U.S. Cl. 161—175          15 Claims

ABSTRACT OF THE DISCLOSURE

A flexible cord used in a spray gun to project powdered mineral substances to form a coating, said cord comprising a core consisting of a first paste containing powdered mineral substances, 0.5% to 8% by weight of at least one binder, and at least one plasticizer and/or diluent and a second paste forming an organic film covering to protect the core, is disclosed. The cord is formed by conjugate extrusion of the pastes.

---

This invention relates to a cord which is intended to be fed to a spray gun for projecting a powder of one or a number of mineral substances so as to form a coating by spraying in a hot gas stream and is also concerned with a method of manufacture of the product used for supplying said spray gun.

It will henceforth be common practice to coat parts of various shapes with metal oxides or other substances by projecting such products in powdered form in the flame of a blowpipe at high temperature.

The torches or blowpipes which are usually employed and available on the market are fed with wire in the case of metals or with rods which may or may not be sintered, or with powders when it is desired to project refractory oxides, carbides, nitrides and so forth.

The rods are fabricated in accordance with a known process by preparing a paste from the oxide to be projected and an organic binder, by shaping said paste by extruding under pressure, for example, then agglomerating the oxide powders by heat treatment at high temperature in such a manner that said rods become dense and rigid.

This method of fabrication of previously sintered rods is very costly by reason of the temperature at which the sintering process has to be conducted and the special furnaces which are required for that purpose. A very large number of rods is unfit for use as a result of the failures and substantial deformations caused by shrinkage during baking.

Furthermore, inasmuch as the discharge nozzle of the projection blowpipe is calibrated to a close tolerance, the diameter of rods must be well defined and ovalization or even slight cambering of said rods makes these latter unfit for use. These rejects are made even more costly by virtue of the fact that the material is irretrievably lost.

According to a known method, the rods are formed by agglomerating a powder of one or a number of substances which do not decompose at high temperature, said substances being mixed with at least one binder which is of sufficiently high strength to render it unnecessary to subject said rods to a sintering process. The utilization of rods of the type last mentioned is advantageous, particularly by virtue of their more uniform dimensions, which permits of a substantial economy of the material employed.

However, the present applicant has experienced considerable difficulty in applying practically continuous projections when the rods of this type which are fed to the blowpipe are of short length. The design of the automatic distributor in fact sets a number of serious problems. The projection is in fact non-continuous in view of the fact that, at the end of each rod, that part of said rod which is located between the feed rollers and the nozzle is discharged from the gun and this very hot fragment which is projected onto the part to be coated is liable to adhere thereto and to result in unequal thicknesses or else to rebound and expose personnel to physical danger. It is therefore necessary to make provision for a shielding system which on the one hand serves to mask the part at the moment of ejection of said rod extremities and which, on the other hand, serves to protect against rebounds.

Finally, the sintered rods have low resistance to thermal shock and it frequently occurs that they break as they pass through the blowpipe flame. The failure which thus occurs also results in the ejection of fragments and coarse particles onto the surface of the object to be coated and the deposit formed is irregular, has low mechanical strength and high porosity.

It is also possible to supply spray guns with a flexible wire consisting of powdered metals mixed with metalloids or refractory minerals and a plastic binder. Apart from the fact that this type of wire has little real flexibility, it does not permit the possibility of forming oxide coatings of high purity.

Spray guns which make use of powders instead of sintered or unsintered rods are not in principle subject to these limitations. However, it is in this case difficult to obtain a uniform deposit, mainly as a result of the irregularity of supply of powder in the flames. This irregularity is mainly due to accidental causes such as variations in moisture of the powder and/or in the flow rate of the transporting gas, variable operation of mechanical feed regulators, and so forth. Moreover, it has been proved that, all other things being equal, the deposits formed by free powders are coarser and have lower density than deposits formed by rods.

The spray-gun cord which is composed of one or a number of mineral substances employed for the formation of a coating by spraying in a hot gas stream as proposed by this invention makes it possible to overcome the various disadvantages referred-to above. The method of manufacture of cord elements for supplying spray guns which also forms the subject of the invention is simple and easy to carry into effect.

The cord which is designed to be fed to a spray gun for projecting a powder of one or a number of mineral substances so as to form a coating by spraying in a hot gas stream is characterized in that it comprises a first paste containing a mixture of one or a number of powdered mineral substances, at least one binder, at least one plasticizer and/or at least one diluent of which at least a part can be removed by drying, and a paste forming an organic film which covers and protects said cord.

In accordance with a first mode of operation, the first paste is surrounded by a second paste which is intended to form the protective organic film and consists of an elastic organic substance and a diluent which can be removed by drying.

In accordance with a second mode of operation, the first paste which forms the core of the cord comprises a small quantity of a liquid which is miscible with water and which has a very low vapor tension at room temperature.

In accordance with a third mode of operation, the binder of the paste which forms the core of the cord contains a small quantity of plasticizer.

Similarly, the paste which is intended to form an organic film contains an elastic organic substance and a diluent of which at least a part can be removed by drying. Said substance can contain a small proportion of a liquid which is miscible with water and which has a very low vapor tension at the drying temperature of the cord.

The invention also has for its object a method which is characterized in that the mineral substance or substances which are intended to form the coating are powdered and mixed with at least one binder (or dispersing agent), one plasticizer and/or at least one diluent of which at least a part can be removed by drying, the resulting paste being homogenized then shaped and the cord thus obtained being then coated with a paste which is intended to form the organic film.

In accordance with the invention, a cord as hereinabove defined for supplying a spray gun and consisting of a core formed of a first paste of one or a number of powdered mineral substances, of binder (or of dispersing agent), plasticizer and/or diluent as well as a sheath formed from an organic paste is fabricated by simultaneous extrusion of said two pastes.

Accordingly, a method of fabrication of a cord for supplying a spray gun preferably consists in disposing the two pastes which form the cord in concentric relation inside the feed cylinder of an extrusion press, the paste which contains the powder to be projected being located at the center and the paste which forms the organic film being located at the periphery, then in extruding by compression and forcing all of said pastes through a nozzle.

However, in order to avoid the difficulties which arise from adjustment of the viscosities of the pastes, there is employed for the fabrication of the cord a device which consists of an assembly of coaxial nozzles having adjacent openings, each of said nozzles being supplied with one of the substances which constitute the coating material.

In order to facilitate the extrusion operation, the plasticities of the two pastes have to be adjusted.

The utilization of a flexible cord in accordance with the invention does not present any disadvantage which is inherent in the use of sintered or unsintered rods or of free powder.

In fact, said cord has the following essential advantages: it is flexible and can therefore be employed as a metallic wire which is insensitive to mechanical shocks, it is crude and therefore insensitive to thermal shocks and also perfectly calibrated. The length of cord can be obtained as required and therefore permits of continuous projection. The plastic sheath in which it is encased protects the cord from any external contamination and renders it insensitive to any hygrometric variations of the ambient atmosphere and makes it possible to project a strictly pure substance since the plastic sheath is entirely burnt within the spray gun. The cord is not subjected as in the case of the free powders to variations of humidity and of flow rate of the driving fluid since it is fed mechanically. The cord is not fragile and can therefore be readily stored and handled. It is possible to fabricate a material having a number of constituents in strictly determined proportions. In addition, such constituents can be incapable of withstanding simultaneously the preliminary sintering treatment which is necessary for the preparation of rods.

This method makes it possible to obtain in a single operation a flexible cord consisting at the center of mineral powder which is intended to be projected as well as an organic substance and at the exterior of a plastic sheath which provides the cord with mechanical strength and flexibility.

The simultaneous intrusion of two pastes may take place in an assembly of coaxial nozzles having adjacent openings, each nozzle being supplied with one of the substances which constitute the cord.

In order that the characteristics of the method of fabrication of the cord in accordance with the present invention may be more readily understood, there now follows below a description of a number of examples of construction of the cord as contemplated by the invention and two modes of application of the method of fabrication of said cord which also form part of the invention, it being understood that these examples do not have any limitative character either in regard to the modes of application or to the uses for which they may be employed.

In the accompanying drawings:

FIG. 1 is a transverse sectional view of the cord which is employed in accordance with the invention;

FIG. 2 is a vertical sectional view of the main elements of an extrusion press for the application of the method of fabrication of the cord;

FIG. 3 is a sectional view of a preferred arrangement for applying the method of fabrication of the cord in accordance with the invention;

FIG. 4 is a longitudinal sectional view of the cord;

FIGS. 5 and 6 illustrate respectively in cross-section and in plan one example of embodiment of a detail of the device in accordance with the invention.

The conditions under which certain constituents of the cord have been selected will first be recalled.

The binder is selected so that, when incorporated in an emulsion or dissolved in a suitable diluent, it confers upon the mineral powder which forms the main body of the cord a sufficient degree of plasticity to permit, of extrusion by means of a press. For reasons of ease of use and reduction in cost price, there has been employed as diluent or suspension agent either water or if necessary a mixture of water and another miscible liquid. Under these conditions, it was possible to employ as binder only organic products which can produce aqueous gels.

The organic products employed were preferably synthesis products having well defined compositions and reproducible properties. Such products were in fact cellulose derivatives: methylcellulose, hydroxymethylcellulose, carboxymethylcellulose or even polymers, namely either polyvinyl alcohol or polymethacrylic acid. Nevertheless, recourse can be had to the aqueous gels of natural organic substances such as gum tragacanth, alginate, dextrin.

It is also possible to make use of organic binders which cannot be dispersed or dissolved in water but in organic solvents such as benzene, toluene, trichloroethylene and the like. These binders are polymers or resins such as cellulose acetate, vinyl derivatives or even rubber. However, it will be noted that the use of these organic solvents is difficult since many of these substances are toxic and inflammable and their utilization therefore calls for special arrangement of workshops.

The use of aqueous binders for the purpose of forming the cord in accordance with the invention is therefore advantageous. The present applicant has found that it was preferable to select a binder so that, after evaporation of its solvent or of its diluent, good cohesion is retained between the grains of the mineral powder which must none-the-less remain relatively flexible by reason of the fact that the cord is intended to be wound on reels, for example, without thereby producing either internal or external failure as a result of this operation.

The plasticity of the organic binder is therefore increased after the water has been removed if there is incorporated therewith a certain proportion of plasticizer or of liquid which is miscible with water and which has a very low vapor tension at room temperature. Liquids of this type are, for example, glycerine, the esters of glycol:ditriethyleneglycol. Under these conditions, the drying of the cord results in the removal of water but said liquids remain and endow the binder with a substantial degree of flexibility.

In a particular instance in which it is necessary to prepare a cord for the projection of alumina, any risk of fracture of the mineral compound can be limited more effectively by adding thereto a certain proportion of colloidal alumina hydrate which, in the presence of water, also produces a gel which facilitates the subsequent extrusion operation and makes it possible to reduce the proportion of organic binder.

Under these conditions, the proportion of dry organic binder with respect to the weight of mineral powder can be comprised between 0.5% and 8%.

The present applicant has also found that, again in order to ensure convenient use and economy, the film which is intended to form a sheath for the cord is preferably constituted by an organic substance which is either soluble or which can be dispersed or converted to gel in the presence of water. It is also possible to make use of organic synthesis products such as methylcellulose, hydroxyethylcellulose, carboxymethylcellulose, polyvinyl alcohol and the like, or natural organic substances such as gum tragacanth, gum arabic, or alginates, and so forth.

The sheath which is applied on the mineral cord must remain flexible, strong and be capable of undergoing deformations, torsion, traction, without resulting in fracture.

When adding to the product which forms the sheath a certain proportion of liquid which is miscible with water but which has low vapor tension at the drying temperature of the cord, it is possible to make use of glycerine or glycol or any liquid which satisfies the conditions previously set forth.

There is thus obtained a very flexible sheath which is practically insensitive to climatic conditions and to atmospheric hygrometry.

It will be noted that the different compositions of sheath which have been described have not been given in any limiting sense.

It is also possible to utilize a solution or a dispersion or a gel of an organic substance in a solvent which is also an organic substance. Finally, the methods of application of the sheath such as co-extrusion, dipping, spraying (electrostatic guns, for example) can be wholly independent of the shaping of the mineral paste.

There will now be described two devices for the practical application of the method in accordance with the invention.

The cross-sectional view of the cord as seen from FIG. 1 shows at the center of the cord the mixture 2 of refractory material to be projected together with a binder and at the exterior of the cord the ring of organic material which performs the function of the sheath 4.

It can be seen from a study of FIG. 2 that the feed cylinder 6 of the extrusion press extends downwards in the form of a conical portion to which is fitted an extrusion nozzle 8, the internal diameter of which corresponds to the diameter of the cord which it is desired to produce.

The ram of the extrusion press is shown at 10 and is intended to compress a plastic mass which is formed of a central cylindrical "cake" made up of the mineral powder as well as binders and plasticizers 2 and surrounded by an organic compound 4. These two products are conjointly extruded at high pressure and the cord 12 which is delivered from the nozzle is made up of two parts having the same composition as the materials which were introduced into the feed cylinder of the press.

FIG. 3 represents an apparatus which is preferably employed for the purpose of fabricating a cord in accordance with the invention, and shows two extusion vessels or cans 21 and 22 of cylindrical shape. Said two vessels contain two substances 30 and 40 which are placed under conditions such that they are capable of undergoing the extrusion process. Two pistons 23 and 24 are adapted to move respectively within said two vessels.

The vessel 22 terminates in a nozzle 25. The vessel 21 communicates by way of a duct 26 with a second nozzle 27 which is coaxial with the first. Both nozzles have two different diameters and open into the same passage 28.

The operation of the complete assembly is as follows:

Under the action of the pistons 23 and 24, the substances 30 and 40 fall together and are subjected to the extrusion action within the nozzles 25 and 27.

After extrusion, the substance 40 is placed inside a sheath which is formed by the substance 30.

As will be readily understood, the machine which is contemplated herein can lend itself to a number of alternative forms.

The extrusion nozzle profiles need not be of circular configuration.

The outer nozzle 27 can be supplied in the manner which is shown in transverse cross-section in FIG. 5 and in plan in FIG. 6. There can be seen in these two figures a system of passageways 31 which open into the nozzle. There can be formed for the substance 40 a partial sheath, namely a sheath which does not extend over the entire external surface thereof.

The present device has an important advantage in that it makes it possible to associate two substances having very different viscosities, irrespective of the ratios of nozzle sections.

Moreover, the geometry of the product obtained depends solely on the two nozzles and its constancy and precision are of a high order.

The applications of the cord are many and varied.

EXAMPLE I

Fabrication of a cord for the projection of alumina.

Mineral composition of the material which is intended to form the deposit:

Fusion-cast alumina=particles having a diameter within the range of 10 to $70\mu$: 50%

Calcined alumina=particles having a diameter less than $50\mu$: 50%

These two alumina are mixed in the dry state, then receive an addition of 5% by weight of ammonium stearate and 1.5% hydroxyethylmethylcellulose in powdered form. These products are again mixed in the dry state. A proportion of 19% by weight of water is then added and the aggregate is subjected to powerful mixing (for example in a pug mill) for a period of one hour. Finally, the paste thus obtained is allowed to stand for a period of a few hours.

In addition, the mixture having the following composition by weight: 100 parts hydroxyethylmethylcellulose in powdered form (of a grade such that a 2% solution in water has a viscosity of 50 centipoises at 20° as determined by the Hoeppler viscosimeter) and 110 parts of water are malaxated. The paste obtained must be perfectly homogeneous and consequently free of agglomerates or incompletely dissolved particles.

In the cylinder of a clamping press 160 mm. in diameter, there is placed a metal tube having a diameter of 125 mm. The mineral paste which was first described is placed at the center of said tube and then compacted. The paste which is intended to provide the protective coating hereinabove described is then placed around said tube and a pressure of 100 tons is then applied. After compression, the central tube is removed and there is thus obtained a "cake" which has a coaxial structure and is formed in two parts. The complete assembly is placed within the "can" of the extrusion press of FIG. 2 and forced through a conical nozzle having a discharge opening 3 mm. in diameter, under a pressure of 25 tons.

Throughout the duration of the extrusion operation, the cord has two well defined layers and the ratio of the diameters remains constant from the commencement to the end of the extrusion process.

The external organic layer can be more readily distinguished from the central compound if said layer is colored by means of an organic coloring agent which is completely eliminated during the process of projection with the blowpipe.

After drying, the cord is flexible and can be coiled onto a reel, but nevertheless retains high mechanical strength.

It should also be noted that the central mineral material can be of high purity and is not contaminated by the components of the press cylinder or nozzle inasmuch as it is the non-abrasive plastic layer which is subjected to friction forces against the metal walls.

EXAMPLE II

Fabrication of a cord for the projection of calcium zirconate.

Mineral composition of the material which is intended to form the deposit:

Calcium zirconate having a diameter of grains (which are graded by means of an air separator) which is comprised between 15 and 50μ.

There are added to this power in the dry state 4% by weight of ammonium alginate and 2% diglycol stearate. After an intimate mixture has been formed, there are then added 20% by weight of water and malaxation is carried out for a period of one hour. Finally, the paste is allowed to stand for several hours.

In addition, a further mixing or malaxation process is applied to the mixture having the following composition by weight:

100 parts hydroxyethylmethylcellulose in powdered form and 110 parts water.

During malaxation, there is added 0.5% by weight of glyoxal which is intended to inhibit hygroscopicity of the film obtained as well as to ensure inertness of said film to micro-organisms.

This compound is processed and shaped as in the case of Example I.

EXAMPLE III

This example relates to a cord which is fabricated by means of the device of FIG. 3. In this case, the central compound contains 63% titanium oxide, 7% organic binder and 30% water (malaxated, bonded, pressed prior to extrusion). The outer sheath is formed of methylhydroxyethylcellulose to which is added a lubricant which is miscible with water.

The paste is fed into the cylinder 21. Methylhydroxyethylcellulose is also placed in the cylinder 22. The two products which are placed within their respective cylinders are forced through the nozzles by applying a pressure by means of pistons 23 and 24.

The product obtained is presented in the form of a continuous cord having a cross-section which is imposed by the shape and dimensions of the opening of the nozzle 25 and clad with a layer of methylhydroxyethylcellulose, of polyvinyl having a thickness which is determined by the profile of the second nozzle 27.

After cooling of the outer layer of resin which hardens, the part can be handled without any special precautions being required, and can be stored by stacking on other parts without any danger of scoring or damage to the outer surface of the mineral composition. This outer organic layer will serve to protect the cord from any mineral dust particles which inevitably contaminate a workshop for the fabrication of ceramic products. The cord can be washed just before heat treatment with a view to removing said dust particles.

The organic protective layer referred-to will also serve to protect the crude ceramic component from hygrometric variations in the atmosphere of the workshop and will prevent it from re-absorbing atmospheric water, which could result in deformations or even fractures during heat treatment.

EXAMPLE IV

Fabrication of an aluminum oxide cord (a) *Preparation of the inner mineral paste.*—Fusion-cast alumina (particles havng a diameter within the range of 30 to 70μ) is mixed when dry with 2% hydroxyethylmethylcellulose and 2% polyvinyl alcohol. There is additionally prepared a suspension of aluminum hydroxide flocculated with acetic or nitric acid. A quantity of 5% by weight of said hydroxide with respect to the weight of fusion-cast alumina is added to 4.4 times its weight of hot water (80° C.).

When this gel is quite homogeneous, it is added to the mixture of alumina plus hydroxyethylmethylcellulose and polyvinyl alcohol. Powerful malaxation in a pug mill is then carried out for a period of 15 minutes approximately.

During this malaxation process, 1% by weight of glycerin with respect to the weight of alumina is added.

Finally, the overall composition of the paste will be:

| | Parts |
|---|---|
| Alumina | 100 |
| Hydroxyethylmethylcellulose | 2 |
| Polyvinyl alcohol | 2 |
| Aluminum hydroxide | 5 |
| Glycerine | 1 |
| Water | 22 |

In order that the paste obtained should be perfectly homogenized, said paste is forced under pressure through a nozzle which is pierced by holes approximately 1 mm. in diameter.

After these two operations, the paste is compressed in the form of an homogeneous cylinder.

(b) *Preparation of the organic sheathing paste.*—20 liters of hot water and 6 kilograms of hydroxyethylmethylcellulose (of a grade such that a 2% solution in water has a viscosity of 50 centipoises at 20° C. as determined by the Hoeppler viscosimeter) are malaxated in a pug-mill. After approximately 45 minutes of malaxation and when the gel appears to be quite homogeneous there are then added 3 kilograms of pure glycerin and if necessary a small quantity of organic coloring matter. The aggregate is again malaxated for a period of 15 minutes and the paste obtained is then allowed to stand for a period of 24 hours in a closed vessel.

By carrying out the operation under conditions which are identical with those of Example I and in an apparatus which is similar to that of FIG. 2, a flexible cord is thus obtained.

It is possible to form very great lengths of cord; said lengths depend essentially on the capacity of the cylinders of the presses employed.

FURTHER EXAMPLES

There can now be given by way of non-limitative example the method employed for the formation of a cord for the projection of zirconium oxide and calcium zirconate.

Titanium oxide.
Chromium oxide,
Rare earth oxides,
Mixed aluminum and magnesium oxide: spinel,
Zirconium silicate,
Calcium fluoride, etc., and, broadly speaking, all the mineral compounds which do not decompose during fusion and the boiling point of which is not too close to the melting point.

The case of metals is special since it is wholly obvious that, in the case of metals which can readily be converted into wire, that is to say which can be withdrawn at low cost, there is no advantage in forming a flexible cord from such metals. On the other hand, in the case of metals and alloys which are highly refractory and have low ductility, and consequently which cannot readily be drawn into wire, the fabrication of a cord from powders of these metals is undoubtedly an advantage.

Another particular case is the projection of a mixture of metals and oxides ("cermets") which can quite readily be produced by supplying the spray gun with a cord consisting of a mixture of these two elements whereas the fabrication of rigid sintered rods is technically very difficult to perform and excessively costly.

What I claim is:

1. A flexible cord for feeding a spray-gun for projecting at least one powder of a plurality of mineral substances forming a coating in a hot gas stream comprising a core of a first paste containing said powdered mineral substances, 0.5% to 8% by weight of at least one binder, at least one element selected from the group consisting of plasticizers, diluents, and combinations thereof, adjusting the plasticity of said first paste and a second paste forming an organic film covering and protecting said core and the cord.

2. A cord as described in claim 1, said element of said first paste being at least one plasticizer.

3. A cord as described in claim 1, said element of said first paste including at least one evaporable diluent.

4. A cord as described in claim 1, said element of said first paste including at least one plasticizer and at least one evaporable diluent.

5. A cord as described in claim 3, said diluent comprising a liquid miscible with water and having a low vapor tension at room temperature.

6. A flexible cord as described in claim 4, said binder being essentially a cellulose resin.

7. A flexible cord as described in claim 6, said cellulose resin being derived from hydroxyethylmethylcellulose.

8. A flexible cord as described in claim 1, said mineral substances comprising a mixture of powdered alumina and aluminium hydroxide.

9. A flexible cord as described in claim 8, the percentage of aluminium hydroxide being about 5% by weight.

10. A flexible cord as described in claim 1, said second paste comprising about 100 parts of an elastic organic compound, about 110 parts of an evaporable diluent and a liquid miscible with water having a low vapor tension.

11. Process for the fabrication of a cord for a spray-gun projecting a powder of at least one of a plurality of mineral substances forming a coating in a hot gas stream, the steps of finely dividing said mineral substances, mixing said substances with at least one binder and with at least one element selected from the group consisting of plasticizers diluents, and combinations thereof to form a first paste, said element adjusting the plasticity of said first paste, homogenizing said first paste, preparing an organic film-forming second paste then extruding a cord from said first paste and covering said cord with said organic film during extrusion of said cord.

12. Process as described in claim 11, said element including at least one plasticizer.

13. Process as described in claim 11, said element including at least one evaporable diluent.

14. Process as described in claim 11, said element including at least one plasticizer and at least one evaporable diluent.

15. Process as described in claim 11 including the steps of disposing said first and second pastes in concentric relation with the feed cylinder of an extrusion press, said first paste being disposed at the center and said second paste being disposed at the periphery of the cylinder and then extruding said pastes by compression forcing said pastes through the extrusion nozzle.

References Cited

UNITED STATES PATENTS

| Patent No. | Date | Inventor | Class |
|---|---|---|---|
| Re. 25,829 | 8/1965 | Wagner | 117—105.2 |
| 2,257,104 | 9/1941 | Burrows et al. | 161—175 |
| 2,390,765 | 12/1945 | York et al. | 106—57 |
| 2,958,609 | 11/1960 | Stoll et al. | 117—105.2 |
| 2,993,236 | 7/1961 | Brimley et al. | 264—171 |
| 3,028,257 | 4/1962 | Surchek et al. | 117—105.2 |
| 3,055,591 | 9/1962 | Shepard | 117—105.2 |
| 3,171,774 | 3/1965 | Wheildon et al. | 161—181 |
| 3,310,423 | 3/1967 | Ingham | 117—93 |

OTHER REFERENCES

Modern Plastics Encyclopedia, September 1957, p. 439.

ROBERT F. BURNETT, Primary Examiner

L. M. CARLIN, Assistant Examiner

U.S. Cl. X.R.

117—105.2, 93.1; 264—171